Patented Feb. 26, 1946

2,395,776

UNITED STATES PATENT OFFICE 2,395,776

COLOR PHOTOGRAPHY

Abraham Bavley, Binghamton, N. Y., assignor to General Aniline & Film Corporation, New York, N. Y., a corporation of Delaware No Drawing. Application October 1, 1943, Serial No. 504,595

11 Claims. (Cl. 95—6)

This invention relates to the production of color photographic images by color-forming development and more particularly to new coupling compounds therefor.

The new color coupling compounds are described in my copending application Serial No. 490,632, filed June 12, 1943, of which the present application is a continuation-in-part.

It is known to form color photographic images by development of an exposed silver halide emulsion with an aromatic amino developer in the presence of a coupling compound or color former. The color former may be present in the emulsion or in the developing solution and in the development process couples with the oxidation product of the aromatic amino developer to form a dye image in the emulsion. The developed emulsion may then be bleached for removal of the silver image leaving the color image in the emulsion.

I have found that an improvement in producing photographic color pictures by color-forming development may be obtained by employing as the color formers or coupling compounds capable of forming a dyestuff with the oxidation product of an aromatic amino developer, aralkyl and aryl guanazols (3.5-diamino-1.2.4-triazoles Beilstein (4th ed.) 26, 193, 195) in which at least one and preferably both of the amino groups on the triazole ring are mono-substituted by an acylaceto group. The coupling compounds have the following general formula:

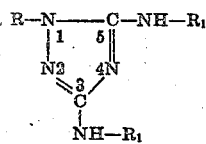

wherein R represents an aralkyl or aryl radical, e. g. benzyl, phenyl, naphthyl, anthranyl, diphenyl and the like, which further may be substituted by such groups as halogen atoms, e. g. chlorine, bromine, etc., nitro, amino, sulfo, hydroxyl, carboxyl, alkoxy, e. g., methoxy, ethoxy, propoxy, dodecoxy, heptadecoxy, etc., aryloxy, e. g. phenoxy, naphthoxy, etc., hydrocarbon and hydroxy hydrocarbon groups, such as methyl, ethyl, propyl, butyl, octyl, decyl, dodecyl, stearyl, cyclohexyl, benzyl, phenyl, hydroxy methylene, hydroxy ethylene, hydroxy propylene, hydroxy phenyl, hydroxy naphthyl and the like, and $R_1$ represents hydrogen or the acylaceto group

—COCH$_2$COR$_2$ wherein $R_2$ represents an organic radical which is free from color-forming phenolic hydroxyl groups, one $R_1$ always being the aforesaid acylaceto group.

$R_2$ may be an alkyl, cycloalkyl, aralkyl, aryl or heterocyclic group, e. g., methyl, ethyl, propyl, decyl, stearyl, cyclohexyl, naphthenyl, abietyl, benzyl, phenyl, naphthyl, anthranyl, diphenyl, pyridyl, quinolyl, thiazolyl, furyl, etc., which groups further may be substituted as in the case of the groups R with the exception that in the case of hydroxyl substituents they should not with the aryl group constitute color-forming phenolic hydroxyl groups.

It is known in the art that the development of an exposed silver halide emulsion with a primary aromatic amine in the presence of a compound containing an acylaceto group leads to the formation of yellow dyestuff images. Similarly, the art is cognizant of the fact that the development of an exposed silver halide emulsion with a primary aromatic amine in the presence of a phenol, the hydroxyl group or groups of which are para to a reactive coupling center, i. e., a free position or one occupied by a group which splits off in the coupling reaction, produces cyan images. If, therefore, there were present in the color formers of the present invention such phenolic groups in addition to the acylaceto groups, dyestuff images would result upon color-forming development which would not possess the intended color. Consequently, in order for the color formers of the present invention to function in color photography in the manner intended, it is essential that they be free from color-forming phenolic hydroxyl groups.

Where both of the guanazol amino groups contain an acylaceto group $R_1$ in accordance with the preferred embodiment of the invention, this group may be the same or different. In either event, the compounds contain two active methylene groups which enhance the stability of the color obtained on coupling of the compounds with an aromatic amino developer, e. g. p-amino diethyl aniline, in the presence of an exposed silver halide emulsion.

Among the color-forming compounds embraced by the invention are, for example, the mono- and di-acetylaceto-1-benzyl, -1-phenyl, -1-naphthyl and -1-diphenyl guanazols

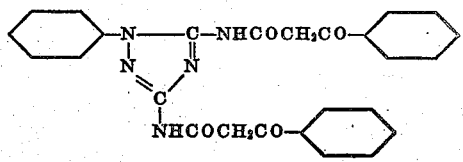

3.5-di(benzoylaceto)-1-phenyl guanazol

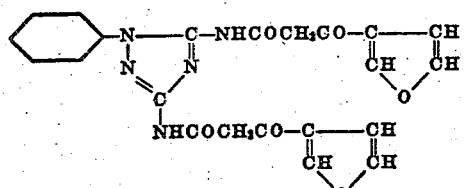

3.5-di(furoylaceto)-1-phenyl guanazol

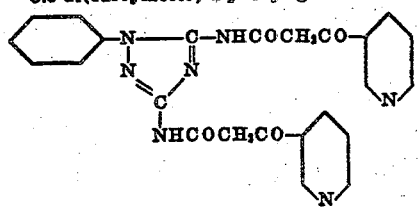

3.5-di(nicotinoylaceto)-1-phenyl guanazol

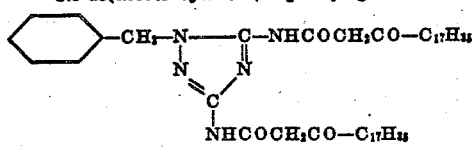

3.5-di(stearoylaceto)-1-benzyl guanazol

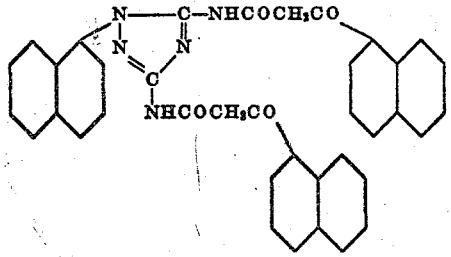

3.5-di(α-naphthoylaceto)-1-naphthyl guanazol

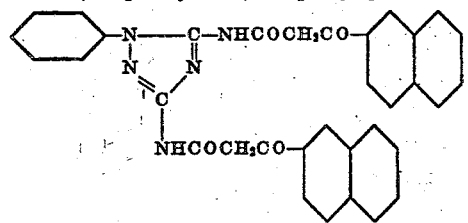

3.5-di(β-naphthoylaceto)-1-phenyl guanazol

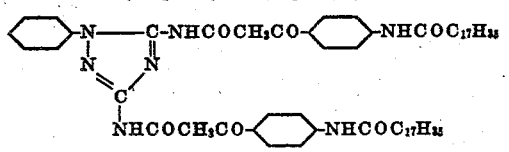

3.5-di(p-stearoylaminobenzoylaceto)-1-phenyl guanazol

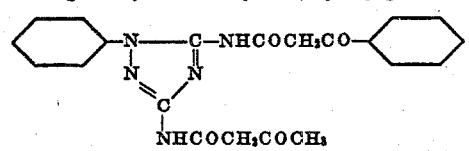

3-acetylaceto-5-benzoylaceto-1-phenyl guanazol

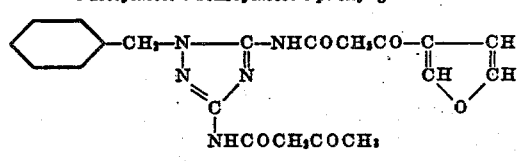

3-acetylaceto-5-furoylaceto-1-benzyl guanazol

In general the new coupling compounds are water-insoluble. Their solubility in water may be increased, however, by the introduction of suitable solubilizing groups, e. g., sulfo or carboxyl groups, into either or both of the groups represented by R and $R_2$.

The color coupling compounds of the invention may be prepared by heating to condensation in an inert solvent, e. g., benzene, xylene or dioxane, one mol of a guanazol of the formula:

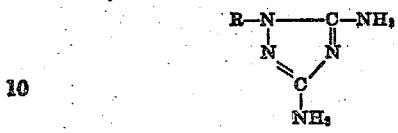

with one or two mols of a β-keto acid ester of the formula:

$$R_2COCH_2COOR_3$$

wherein R and $R_2$ are as defined above and $R_3$ is a simple alkyl group, e. g., methyl or ethyl. A well-known example of the β-keto acid esters is acetoacetic ester.

The color formers may be added to the developer or to the emulsion and in the form of solutions or suspensions in solvents such as 1N alcoholic sodium or potassium hydroxide, acetone, ethyl alcohol, isopropyl alcohol, etc. Dispersing agents such as isopropyl naphthalene sulfonic acid may be used in preparing the suspensions of the insoluble color formers and for assisting in dispersing these color formers in the emulsion.

The color former and solvent may be employed in the following ratio:

A

Color former _____ grams__ 0.1
Solvent _____ cc__ 2

In the event that the color formers are located in the emulsion layer, it is necessary that the constitution thereof be such that they will not migrate from one layer to the other, else color distortion would result upon color-forming development. It has been proposed to prevent migration of color formers from silver halide emulsion layers by rendering such color formers "fast to diffusion in gelatin." This result may be accomplished in several ways, for instance, by including in the color formers proper a group which in the sense of the dyestuff art is substantive or by so enlarging the molecule of the color formers that it is incapable of diffusing from gelatin. Examples of color formers which are rendered fast to diffusion by the first method are disclosed in U. S. P. 2,179,228. Examples of color formers which are rendered fast to diffusion by the second method are disclosed in U. S. Patents 2,178,612, 2,179,244, 2,186,719, 2,186,732, 2,186,849, and 2,186,734. It will be seen from a reference to the latter patents that the color formers thereof have been modified by the inclusion of radicals of resins, of polypeptides, of hydrogenated ring systems, of carbohydrates, of long alkyl chains, and by having the radical of the color formers recur a number of times in the final molecule. It is to be understood that the color formers of the present invention may include substantive groups or molecular enlarging groups (in addition to those previously mentioned) for the purpose of rendering the same fast to diffusion.

Any of the aromatic amino developing agents may be used with the color coupling compounds of the invention. Preferred developing agents are the p-amino dialkyl anilines, e. g., p-amino-dimethyl aniline and p-amino-diethyl aniline. Preferably they are used in the form of salts such as the hydrochloride. The aromatic amino developing agents are characterized by the presence of a free or primary amino group in the molecule which enables the oxidation product of the developer to couple with the color former to form a dye image in the emulsion adjacent the individual particles of the silver image. The silver image may be removed by bleaching with Farmer's reducer to leave the color image in the emulsion.

A developer of the following formula may be used with the color formers of the invention:

B

| | | |
|---|---|---|
| p-Amino diethyl aniline HCl | grams | 2.5 |
| Sodium sulfite anhydrous | do | 0.5 |
| Sodium carbonate anhydrous | do | 67.5 |
| Potassium bromide | do | 2.5 |
| Water to | liter | 1 |

The exposed silver halide emulsions are developed in solution B in the usual manner, the solution or suspension A of the color former being added to the developer solution B where it is not present in the emulsion.

The invention is illustrated by the following specific examples to which it is not intended that it be limited. Parts are by weight unless otherwise indicated.

*Example I*

The color former, 3.5-di(acetylaceto)-1-phenyl guanazol

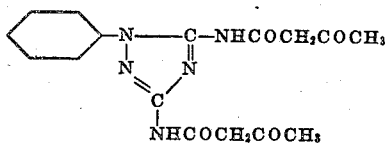

was prepared by dissolving 3 parts of phenyl guanazol in 35 parts of dry xylene as solvent and adding thereto 5.35 parts (2.4 mol equiv.) of acetoacetic ester. After refluxing this mixture for 15 minutes, approximately 10 parts of a mixture of the solvent and the alcohol formed was distilled off. The yellow liquid residue was decanted and allowed to cool. The precipitated product after filtering and recrystallizing from ethanol had a melting point of 195° C.

To 10 cc. of a gelatin silver bromide-iodide emulsion one-tenth part of the above color former dissolved in 2 cc. of 1N alcoholic KOH was added with thorough mixing. After coating the emulsion containing the color former onto a suitable support and drying the same it was given a light exposure and developed in solution B. A dye image of excellent yellow color was formed in the emulsion.

*Example II*

Following the procedure of Example I, the color former 3.5-di(benzoylaceto)-1-phenyl guanazol

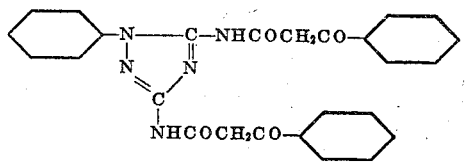

of melting point 218°–220° C. was prepared from reacting equivalents of phenyl guanazol and ethyl benzoyl acetate and incorporated in a gelatin silver halide emulsion layer. After exposing the layer to light it was developed in solution B. A yellow dye image of marked clarity of color and distinguished by the absence of orange coloration was formed in the emulsion.

I claim:

1. A process of producing a color photographic image in a silver halide emulsion which comprises exposing the emulsion and developing it with a primary aromatic amino developing agent in the presence of a compound selected from the group consisting of the acylacetamino-1,2,4-triazoles of the general formula:

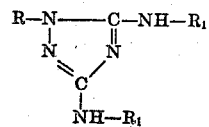

wherein R is selected from the group consisting of aralkyl and aryl radicals, $R_1$ is selected from the group consisting of H and the acylaceto radical $—COCH_2COR_2$ wherein $R_2$ is an organic radical, $R_1$ being at least once the aforesaid acylaceto radical, said compounds being free from color-forming phenolic hydroxyl groups.

2. A process of producing a color photographic image in a silver halide emulsion which comprises exposing the emulsion and developing it with a primary aromatic amino developing agent in the presence of a 3.5-di(acylacetamino)-1,2,4-triazole free from color-forming phenolic hydroxyl groups and having in 1-position of the triazole ring a member of the group consisting of aralkyl and aryl radicals.

3. A color-forming photographic developer comprising a primary aromatic amino developing agent and a compound selected from the group consisting of the acylacetamino-1,2,4-triazoles of the general formula:

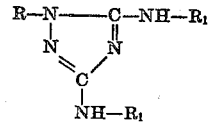

wherein R is selected from the group consisting of aralkyl and aryl radicals, $R_1$ is selected from the group consisting of H and the acylaceto radical $—COCH_2COR_2$ wherein $R_2$ is an organic radical, $R_1$ being at least once the aforesaid acylaceto radical, said compounds being free from color-forming phenolic hydroxyl groups.

4. A color-forming photographic developer comprising a primary aromatic amino developing agent and a 3.5-di(acylacetamino)-1,2,4-triazole free from color-forming phenolic hydroxyl groups and having in 1-position of the triazole ring a member of the group consisting of aralkyl and aryl radicals.

5. A color-forming photographic developer comprising a primary aromatic amino developing agent and a 1-phenyl-3.5-di(acetylacetamino)-1,2,4-triazole free from color-forming phenolic hydroxyl groups.

6. A color-forming photographic developer comprising a primary aromatic amino developing agent and a 1-phenyl-3.5-di(benzoylacetamino)-1,2,4-triazole free from color-forming phenolic hydroxyl groups.

7. A silver halide emulsion for color photography containing as a color former a compound selected from the group consisting of the acylacetamino-1,2,4-triazoles of the general formula:

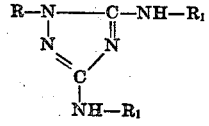

wherein R is selected from the group consisting of aralkyl and aryl radicals, $R_1$ is selected from the group consisting of H and the acylaceto radical —$COCH_2COR_2$ wherein $R_2$ is an organic radical, $R_1$ being at least once the aforesaid acylaceto radical, said compounds being free from color-forming phenolic hydroxyl groups.

8. A silver halide emulsion for color photography containing as a color former a 3,5-di(acylacetamino)-1,2,4-triazole free from color-forming phenolic hydroxyl groups and containing in 1-position of the triazole ring a member of the group consisting of aralkyl and aryl radicals.

9. A silver halide emulsion for color photography containing as a color former 1-phenyl-3,5-di(acetylacetamino)-1,2,4-triazole.

10. A silver halide emulsion for color photography containing as a color former 1-phenyl-3,5-di(benzoylacetamino)-1,2,4-triazole.

11. A gelatin silver halide emulsion for color photography containing as a color former 1-phenyl - 3,5 - di(p-stearoylaminobenzoylacetamino)-1,2,4-triazole.

ABRAHAM BAVLEY.